US012063080B2

United States Patent
Han et al.

(10) Patent No.: US 12,063,080 B2
(45) Date of Patent: *Aug. 13, 2024

(54) COMMUNICATION METHOD AND COMMUNICATIONS APPARATUS

(71) Applicant: HUAWEI TECHNOLOGIES CO., LTD., Guangdong (CN)

(72) Inventors: Xiao Han, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

This patent is subject to a terminal disclaimer.

(21) Appl. No.: 17/231,143

(22) Filed: Apr. 15, 2021

(65) Prior Publication Data

US 2021/0234579 A1 Jul. 29, 2021

Related U.S. Application Data

(63) Continuation of application No. PCT/CN2019/111039, filed on Oct. 14, 2019.

(30) Foreign Application Priority Data

Oct. 15, 2018 (CN) .......................... 201811196450.7

(51) Int. Cl.
*H04W 80/08* (2009.01)
*H04B 7/0417* (2017.01)
(Continued)

(52) U.S. Cl.
CPC ......... *H04B 7/0417* (2013.01); *H04B 7/0452* (2013.01); *H04B 7/0689* (2013.01); *H04L 5/0053* (2013.01); *H04W 28/06* (2013.01)

(58) Field of Classification Search
CPC .. H04B 7/0404; H04B 7/0408; H04B 7/0417; H04B 7/0452; H04B 7/0617;
(Continued)

(56) References Cited

U.S. PATENT DOCUMENTS 11,750,251 B2 * 9/2023 Lou ...................... H04B 7/0617
370/329
2006/0271658 A1 * 11/2006 Beliles, Jr. ............. G08B 25/08
709/223
(Continued)

FOREIGN PATENT DOCUMENTS

CN 103024807 A 4/2013
CN 107396443 A 11/2017
(Continued)

OTHER PUBLICATIONS

Office Action issued in CN201811196450.7, dated Jun. 24, 2022, 8 pages.
(Continued)

*Primary Examiner* — Phuc H Tran

(57) ABSTRACT

This application provides a communication method and a communications apparatus. According to the communication method, a first device sends to one or more second devices, by using a control trailer, configuration information used for multiple-input multiple-output (MIMO) communication between the first device and the one or more second devices, so that the MIMO communication can be performed between the first device and the one or more second devices based on the configuration information.

14 Claims, 3 Drawing Sheets

(51) Int. Cl.
*H04B 7/0452* (2017.01)
*H04B 7/06* (2006.01)
*H04L 5/00* (2006.01)
*H04W 28/06* (2009.01)

(58) Field of Classification Search
CPC ..... H04B 7/065; H04B 7/0689; H04L 5/0053; H04W 28/06; H04W 72/046; H04W 88/02
See application file for complete search history.

(56) References Cited

U.S. PATENT DOCUMENTS

| | | | |
|---|---|---|---|
| 2008/0212701 A1* | 9/2008 | Pan | H04W 72/23 375/260 |
| 2017/0127386 A1 | 5/2017 | Kasher et al. | |
| 2017/0201298 A1* | 7/2017 | Cariou | H04W 72/0446 |
| 2017/0332277 A1* | 11/2017 | Xin | H04L 69/22 |
| 2020/0067577 A1* | 2/2020 | Lou | H04B 7/0417 |
| 2022/0166470 A1* | 5/2022 | Sun | H04B 17/336 |
| 2023/0018459 A1* | 1/2023 | Du | H04B 7/0413 |

FOREIGN PATENT DOCUMENTS

| | | |
|---|---|---|
| CN | 109151999 A | 1/2019 |
| EP | 3200497 A1 | 8/2017 |
| WO | 2017184216 A1 | 10/2017 |
| WO | 2018085677 A1 | 5/2018 |

OTHER PUBLICATIONS

Intel, Updates of Solution 1 with alternative UP Convergence Method and Evaluation Procedure, S2-187092, SA WG2 Meeting #S2-127BIS, Jul. 2-6, 2018, Vilnius, Lithuania, 7 pages.

IEEE Std 802.11-2016 (Revision of IEEE Std 802.11-2012), IEEE Standard for Information technology Telecommunications and information exchange between systems Local and metropolitan area networks, Specific requirements, Part 11: Wireless LAN Medium Access Control (MAC) and Physical Layer (PHY) Specifications, IEEE Computer Society, Sponsored by the LAN/MAN Standards Committee, Dec. 2016, 3534 pages.

3GPP, Study on Access Traffic Steering, Switching and Splitting support in the 5G system architecture (Release 16), TR 23.793 V0.6.0 (Jul. 2018), TSGSSA, 80 pages.

P802.11ay D1, Draft Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 Ghz, Lan/Man Standards Committee, IEEE Computer Society, Nov. 2017, 506 pages.

International Search Report and Written Opinion issued in PCT/CN2019/111039, dated Dec. 30, 2019, 8 pages.

Office Action issued in CN201811196450.7, dated Jan. 19, 2022, 8 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/111039, filed on Oct. 14, 2019, which claims priority to Chinese Patent Application No. 201811196450.7, filed on Oct. 15, 2018. The disclosures of the aforementioned applications are hereby incorporated by reference in their entireties.

TECHNICAL FIELD

Embodiments of this application relate to the communications field, and more specifically, to a communication method and a communications apparatus.

BACKGROUND

In a wireless communications system in a high frequency band, for example, in a wireless fidelity (Wi-Fi) system, an access point (AP) may coordinate, by using a beamforming technology, one or more stations (STA) to communicate with the access point. That the AP concurrently communicates with a plurality of STAs is referred to as multi-user multiple-input multiple-output (MU-MIMO). That a plurality STAs concurrently send data in spatial domain to the AP is referred to as uplink MU-MIMO.

To coordinate the uplink MU-MIMO, the AP needs to send, to the plurality of STAs, some configuration information used for the uplink MU-MIMO. For example, the AP needs to transmit indication information to the plurality of STAs, to indicate when the STAs may start transmission concurrently and indicate duration of a frame used for the transmission, to ensure that the STAs can simultaneously complete the transmission. Alternatively, the AP needs to send power control information to the plurality of STAs, so that each STA can increase or decrease a transmit power of the STA to balance powers of the AP for receiving signals from all the STAs and improve reception of a frame of a relatively distant STA.

Therefore, how an AP sends, to STAs, configuration information used for uplink MU-MIMO is a technical problem that needs to be resolved urgently.

SUMMARY

The present disclosure provides a communication method, a communications apparatus, and a related communications product, to implement transmission of configuration information used for MIMO.

According to a first aspect of an example embodiment, this application provides a communication method. The communication method includes: A first device sends, to one or more second devices, configuration information used for multiple-input multiple-output (MIMO) communication between the first device and the one or more second devices, where the configuration information is carried in a control trailer. The first device performs the MIMO communication with the one or more second devices based on the configuration information.

In the communication method, the first device sends, to the one or more second devices by using the control trailer, the configuration information used for the MIMO communication. In addition, compared with a method in which a newly designed frame is used to carry the configuration information, the communication method can help reduce transmission overheads and reduce complexity of communication between the first device and the one or more second devices.

Optionally, the first device may be a network device or a terminal device, and each of the one or more second devices may be a network device or a terminal device.

Optionally, the network device may be an AP, and the terminal device may be a STA.

Optionally, the configuration information may be configuration information used for uplink MU-MIMO.

Optionally, the first device communicates with the one or more second devices in a high frequency band.

With reference to the first aspect, in a first example embodiment, the control trailer is after a data frame.

Herein, that the control trailer is after a data frame may be understood as that the control trailer is after the data frame in a time sequence.

In this implementation, compared with that the control trailer carrying the configuration information is added after another frame, that the control trailer is added after the data frame can further reduce the transmission overheads and further reduce the complexity of communication between the first device and the second device. This is because when there is a control trailer after the data frame, the second device may directly obtain the configuration information from the control trailer after receiving the data frame, and does not need to determine whether the control trailer carries the configuration information or other information.

For example, the AP adds, after a data frame, a control trailer carrying configuration information used for MIMO communication, to obtain a PPDU. Then, the AP sends the PPDU to the STA.

Optionally, the first device may further send indication information to the second device, to indicate whether the control trailer is added after the data frame.

With reference to the first implementation, in a second implementation, there is a padding bit after the control trailer.

For example, the AP may add a control trailer after a data frame, add a padding bit after the control trailer, to obtain a PPDU, and then send the PPDU to the STA.

The first device adds the padding bit after the control trailer, so that PPDUs sent by the first device to different second devices have a same length. Therefore, these second devices can process the respectively received PPDUs at a same time, and further, these second devices can perform, synchronously and in parallel, MIMO communication with the first device.

With reference to the second implementation, in a third implementation, the padding bit is a training sequence.

With reference to any one of the first aspect or the foregoing implementations, in a fourth implementation, the configuration information includes at least one of the following information: a type of a frame that should be fed back by the second device to the first device, information that should be fed back by the second device by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

According to a second aspect of the example embodiment, this application provides a communication method. The communication method includes: A second device receives, from a first device, configuration information used for MIMO communication between the second device and the first device, where the configuration information is carried in a control trailer. The second device performs the MIMO communication with the first device based on the configuration information.

In the communication method, the first device sends, to the second device by using the control trailer, the configuration information used for the MIMO communication. In addition, compared with a method in which a newly designed frame is used to carry the configuration information, the communication method can help reduce transmission overheads and reduce complexity of communication between the first device and the second device.

Optionally, the first device may be a network device or a terminal device, and the second device may be a network device or a terminal device.

Optionally, the network device may be an AP, and the terminal device may be a STA.

Optionally, the configuration information may be configuration information used for uplink MU-MIMO.

Optionally, the first device communicates with the second device in a high frequency band.

With reference to the second aspect, in a first implementation, the control trailer is after a data frame.

Herein, that the control trailer is after a data frame may be understood as that the control trailer is after the data frame in a time sequence.

In this implementation, compared with that the control trailer carrying the configuration information is added after another frame, that the control trailer is added after the data frame can further reduce the transmission overheads and further reduce the complexity of communication between the first device and the second device. This is because when there is a control trailer after the data frame, the second device may directly obtain the configuration information from the control trailer after receiving the data frame, and does not need to determine whether the control trailer carries the configuration information or other information.

For example, the STA receives a PPDU from the AP, where the PPDU includes a data frame and a control trailer, the control trailer is after the data frame, and the control trailer carries configuration information used for MIMO communication.

Optionally, the second device may further receive indication information from the first device, where the indication information indicates whether the control trailer is added after the data frame. Then, the second device may determine, based on the indication information, whether the control trailer is added after the data frame. If yes, the second device may obtain the control trailer that is after the data frame, and obtain the configuration information carried in the control trailer. Otherwise, the second device may not need to obtain the control trailer that is after the data frame or obtain the configuration information, so that resources of the second device can be saved.

With reference to the first implementation, in a second implementation, there is a padding bit after the control trailer.

For example, the AP may add a control trailer after a data frame, add a padding bit after the control trailer, to obtain a PPDU, and then send the PPDU to the STA.

The first device adds the padding bit after the control trailer, so that PPDUs sent by the first device to different second devices have a same length. Therefore, these second devices can process the respectively received PPDUs at a same time, and further, these second devices can perform, synchronously and in parallel, MIMO communication with the first device.

With reference to the second implementation, in a third implementation, the padding bit is a training sequence.

With reference to any one of the second aspect or the foregoing implementations, in a fourth implementation, the configuration information includes at least one of the following information: a type of a frame that should be fed back by the second device to the first device, information that should be fed back by the second device by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

According to a third aspect of the example embodiment, a communications apparatus is provided. The communications apparatus includes various modules or units configured to perform the communication method in any one of the first aspect, the second aspect, or the implementations of the first aspect or the second aspect.

According to a fourth aspect of the example embodiment, a communications apparatus is provided. The communications apparatus includes a processor. The processor is coupled to a memory, and may be configured to execute an instruction in the memory, to implement the communication method in any one of the first aspect, the second aspect, or the implementations of the first aspect or the second aspect.

Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip that can be disposed in a network device. When the communications apparatus is a chip that can be disposed in a network device, the communications interface may be an input/output interface.

In another implementation, the communications apparatus is a terminal device. When the communications apparatus is a terminal device, the communications interface may be a transceiver or an input/output interface.

In another implementation, the communications apparatus is a chip that can be disposed in a terminal device. When the communications apparatus is a chip that can be disposed in a terminal device, the communications interface may be an input/output interface.

Optionally, the transceiver may be a transceiver circuit. Optionally, the input/output interface may be an input/output circuit.

According to a fifth aspect of the example embodiment, a processor is provided. The processor includes an input circuit, an output circuit, and a processing circuit. The processing circuit is configured to: receive a signal by using the input circuit, and transmit a signal by using the output circuit, so that the processor performs the communication method in any one of the first aspect, the second aspect, or the implementations of the first aspect or the second aspect.

In a specific implementation process, the processor may be a chip, the input circuit may be an input pin, the output circuit may be an output pin, and the processing circuit may be a transistor, a gate circuit, a trigger, a logic circuit of any type, or the like. An input signal received by using the input circuit may be but not limited to, for example, a signal received and input by a receiver. A signal output by using the output circuit may be but not limited to, for example, a signal output to a transmitter and transmitted by the transmitter. The input circuit and the output circuit may be a same circuit, and the circuit serves as an input circuit and an output circuit at different moments. Specific implementations of the processor and the circuits are not limited in embodiments of this application.

According to a sixth aspect of the example embodiment, a processing apparatus is provided. The processing apparatus includes a processor and a memory. The processor is configured to: read an instruction stored in the memory, receive a signal by using a receiver, and transmit a signal by using a transmitter, to perform the communication method in any one of the first aspect, the second aspect, or the implementations of the first aspect or the second aspect.

Optionally, there are one or more processors, and there are one or more memories.

Optionally, the memory may be integrated with the processor, or the memory and the processor are disposed separately.

In a specific implementation process, the memory may be a non-transitory memory such as a read-only memory (ROM). The memory and the processor may be integrated into one chip, or may be disposed in different chips. A type of the memory and a manner in which the memory and the processor are disposed are not limited in embodiments of this application.

It should be understood that a related data exchange process such as sending of indication information may be a process in which the processor outputs the indication information, and receiving of capability information may be a process in which the processor receives the input capability information. Specifically, data output by the processor may be output to the transmitter, and input data received by the processor may be from the receiver. The transmitter and the receiver may be collectively referred to as a transceiver.

The processing apparatus in the sixth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated with the processor, or may be independent of the processor.

According to a seventh aspect of the example embodiment, a computer program product is provided. The computer program product includes a computer program (which may also be referred to as code or one or more instructions). When the computer program is run, a computer is enabled to perform the communication method in any one of the first aspect, the second aspect, or the implementations of the first aspect or the second aspect.

According to an eighth aspect of the example embodiment, a computer-readable medium is provided. The computer-readable medium stores a computer program (which may also be referred to as code or an instruction). When the computer program is run on a computer, the computer is enabled to perform the communication method in any one of the first aspect, the second aspect, or the implementations of the first aspect or the second aspect.

According to a ninth aspect of the example embodiment, a communications system is provided. The communications system includes the first device and the second device described above.

DESCRIPTION OF EMBODIMENTS

The following describes technical solutions of this application with reference to the accompanying drawings.

The technical solutions in embodiments of this application may be used in various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5G communications system, a Wi-Fi communications system, or a new radio (NR) access technology system.

Figure 1:
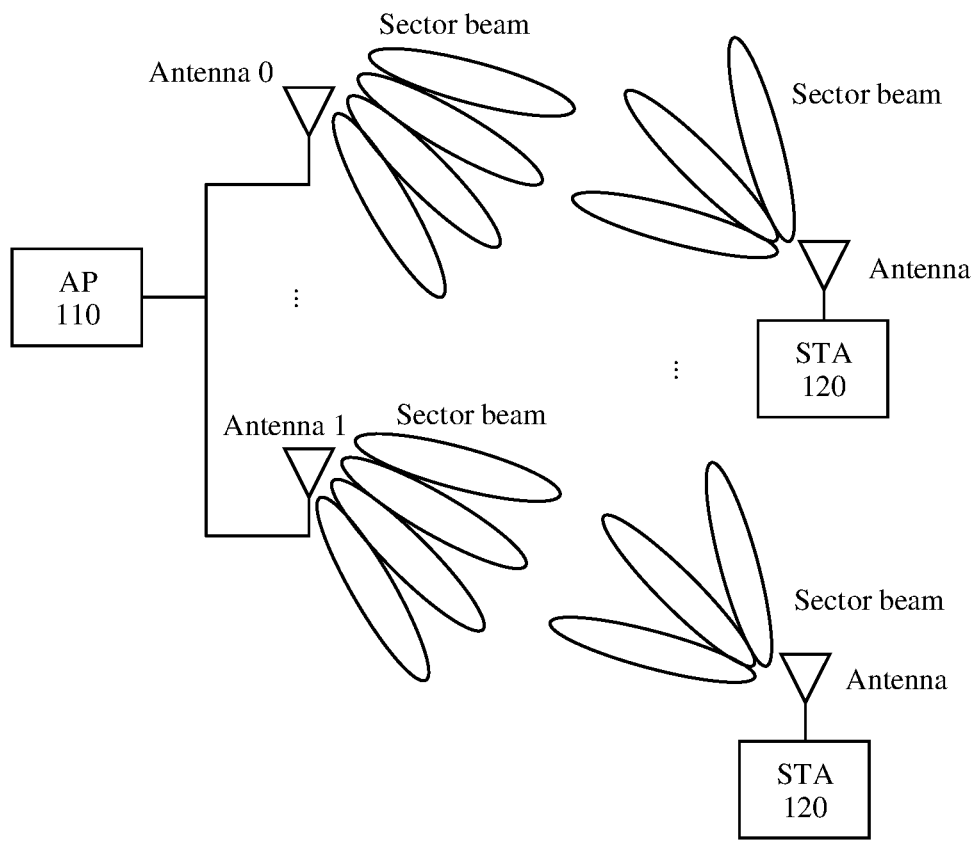
FIG. 1 is a schematic diagram of a communications system applicable to a communication method according to an embodiment of this application.

For ease of understanding the embodiments of this application, a communications system applicable to the embodiments of this application is first described in detail with reference to FIG. 1. FIG. 1 is a schematic diagram of a communications system 100 applicable to a communication method and a communications apparatus according to an embodiment of this application.

As shown in FIG. 1, the communications system 100 may include at least one network device 110 and at least one terminal device 120. The network device 110 may communicate with the terminal device 120 through a radio link. A plurality of antennas may be configured for the network device 110 or the terminal device 120. The plurality of antennas may include at least one transmit antenna configured to send a signal and at least one receive antenna configured to receive a signal. In addition, the network device 110 or the terminal device 120 may further additionally include a transmitter chain and a receiver chain. A person of ordinary skill in the art may understand that the transmitter chain and the receiver chain may include a plurality of components related to signal sending and receiving (for example, a processor, a modulator, a multiplexer, a demodulator, a demultiplexer, or an antenna). Therefore, the network device 110 and the terminal device 120 may communicate with each other by using a multiple-antenna technology.

It should be understood that the network device 110 may be any device having a wireless receiving/sending function. The network device 110 includes but is not limited to an evolved NodeB (eNB), a radio network controller (RNC), a NodeB (node B, NB), a base station controller (BSC), a base transceiver station (BTS), a home NodeB (for example, a home evolved nodeB or a home node B, HNB), a baseband unit (BBU), an access point (AP) in a Wi-Fi system, a wireless relay node, a wireless backhaul node, a transmission point (TP), or a transmission and reception point (TRP), a gNB or a transmission point (a TRP or a TP) in a fifth generation (5G) communications system or an NR system, one antenna panel or a group of antenna panels (including a plurality of antenna panels) of a base station in a 5G system, or a network node, such as a baseband unit (BBU) or a distributed unit (DU) that forms a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling is sent by the DU or is sent by the DU and the CU. It can be understood that the network device may be a CU node, a DU node, or a device including a CU node and a DU node. In addition, the CU may be classified as a network device in a radio access network (RAN), or the CU may be classified as a network device in a core network (CN). This is not limited in embodiments of this application.

It should further be understood that the terminal device 120 may also be referred to as user equipment (UE), an access terminal, a subscriber unit, a subscriber station, a mobile station, a mobile console, a remote station, a remote terminal, a mobile device, a user terminal, a terminal, a STA, a wireless communications device, a user agent, or a user apparatus.

The terminal device in the embodiments of this application may be a mobile phone, a tablet computer (pad), a computer having a wireless receiving/sending function, a virtual reality (VR) terminal device, an augmented reality (AR) terminal device, a wireless terminal in industrial control, a wireless terminal in self-driving, a wireless terminal in a remote medical application, a wireless terminal in a smart grid, a wireless terminal in transportation safety, a wireless terminal in a smart city, a wireless terminal in a smart home, or the like. An application scenario is not limited in the embodiments of this application.

It should be understood that the network device 110 may alternatively be a virtual AP that has a plurality of antennas and that includes a coordinating system having a plurality of APs. One virtual AP may include two or more physical APs, and antennas of these physical APs may be combined to form MIMO, to provide a service for a plurality of STAs.

In some communications systems, for example, a 5G system, to resist a path loss in a high frequency scenario, two communications devices that have a communications connection may obtain gains through beamforming separately. A transmit end such as the network device 110 and a receive end such as the terminal device 120 may obtain a pairing relationship between a transmit beam and a receive beam through beam training.

The beams may be understood as spatial filters or spatial parameters. A beam used for sending a signal may be referred to as a transmission beam (Tx beam), and may be a spatial domain transmit filter or a spatial domain transmit parameter. A beam used for receiving a signal may be referred to as a receive beam (Rx beam), and may be a spatial domain receive filter or a spatial domain receive parameter.

A technology for forming a beam may be a beamforming technology or another technology. For example, the beamforming technology may be specifically a digital beamforming technology, an analog beamforming technology, a hybrid digital/analog beamforming technology, or the like. The transmit beam may refer to distribution of signal strengths formed in different directions in space after signals are transmitted through an antenna, and the receive beam may refer to distribution of signal strengths that are of radio signals received through an antenna and that are in different directions in space.

In an NR protocol, the beam may be, for example, a spatial filter. However, it should be understood that this application does not exclude a possibility that another term is defined in a future protocol to represent a same or similar meaning.

It should be noted that the "beam" and the "spatial filter" may be used alternately. For example, the "transmit beam" and the "spatial domain transmit filter" may be used alternately, and the "receive beam" and the "spatial domain receive filter" may be used alternately. When a difference is not emphasized, they are intended to express a same meaning.

The beam pairing relationship is a pairing relationship between a transmit beam and a receive beam, that is, a pairing relationship between a spatial domain transmit filter and a spatial domain receive filter. A relatively large beamforming gain can be obtained by transmitting a signal between a transmit beam and a receive beam that have a beam pairing relationship.

In an implementation, the transmit end may send a reference signal through beam sweeping, and the receive end may also receive the reference signal through beam sweeping. Specifically, the transmit end may form different directional beams in space through beamforming, and may perform polling on a plurality of different directional beams, to transmit a reference signal through the different directional beams, so that a maximum power for transmitting the reference signal in a direction directed by a transmit beam can be reached. The receive end may also form different directional beams in space through beamforming, and may perform polling on a plurality of different directional beams, to receive a reference signal through the different directional beams, so that a maximum power for receiving the reference signal at the receive end in a direction directed by a receive beam can be reached.

By traversing each transmit beam and each receive beam, the receive end may perform channel measurement based on the received reference signal, and report a measurement result to the transmit end. For example, the receive end may report, to the transmit end, some reference signal resources with relatively large reference signal received powers (RSRP), for example, report identifiers of the reference signal resources, so that the transmit end sends and receives a signal by using a beam pairing relationship with relatively good channel quality during data or signaling transmission.

After beam training between the transmit end and the receive end is completed, the transmit end needs to send configuration information used for MIMO to the receive end, so that the receive end can support the MIMO. The MIMO in the embodiments of this application may be uplink single-user multiple-input multiple-output (SU-MIMO), uplink MU-MIMO, downlink SU-MIMO, or downlink MU-MIMO.

Therefore, the embodiments of this application provide a new communication method in which configuration information used for MIMO can be transmitted from a transmit end (for example, the network device 110) to a receive end (for example, the terminal device 120), to implement MIMO transmission between the transmit end and the receive end.

Figure 2:
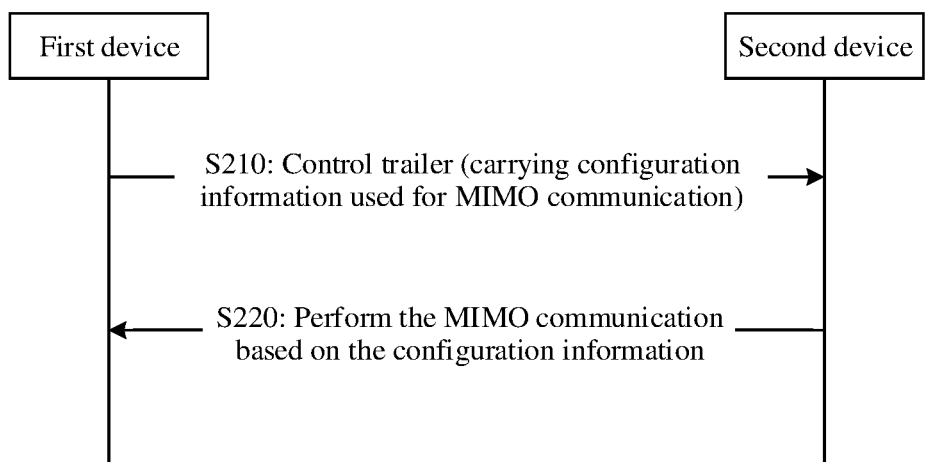
FIG. 2 is a schematic flowchart of a communication method according to an embodiment of this application.

FIG. 2 is an example flowchart of a communication method according to an embodiment of this application. It should be understood that FIG. 2 shows steps or operations of the communication method, but these steps or operations are merely examples. In this embodiment, other operations or variations of the operations in FIG. 2 may be further performed.

S210: A first device sends, to one or more second devices, configuration information used for implementing MIMO between the one or more second devices and the first device, where the configuration information is carried in a control trailer. Correspondingly, a second device in the one or more second devices receives the configuration information from the first device.

A meaning of the control trailer is the same as or similar to a meaning of a control trailer defined in an existing technology, an existing standard, or an existing protocol. For example, the control trailer may be a piece of information added to trails of some packets (for example, data packets) or frames, and the control trailer is used to carry additional indication information.

The configuration information may also be understood as configuration information used to trigger the second device to perform MIMO communication with the first device.

Alternatively, the configuration information may be understood as being used to: indicate, to the second device, information should be sent to the first device by using a MIMO technology, and/or indicate, to the second device, MIMO resources should be used to send information to the first device.

Specific content of the configuration information sent by the first device to different second devices may be the same, or may be different.

The first device may be the network device 110 or the terminal device 120 shown in FIG. 1. The second device may be the network device 110 or the terminal device 120 shown in FIG. 1.

In an example embodiment, the first device may send the configuration information to the second device in a high frequency band.

For example, when the configuration information is used to implement uplink MIMO between a terminal device and a network device, the network device may send the configuration information to the terminal device by using a downlink MIMO technology, or may send the configuration information to the terminal device by using a frequency division multiple access (FDMA) technology.

Alternatively, for example, when the configuration information is used to implement uplink MIMO between a terminal device and a network device, the network device may send the configuration information to some terminal devices in a plurality of terminal devices by using a downlink MIMO technology, and send the configuration information to the other terminal devices in the plurality of terminal devices by using an FDMA technology.

That the network device sends the configuration information to a plurality of terminal devices by using the MIMO technology means that different spatial streams are used by the network device to send the configuration information to the plurality of terminal devices.

That the network device sends the configuration information to the terminal device by using the FDMA technology means that the network device sends the configuration information to the plurality of terminal devices on different frequencies. When the plurality of terminal devices are in a same area, the configuration information may be sent to the plurality of terminal devices by using a same sector or antenna.

The configuration information that is carried in the control trailer and that is used to implement the MIMO between the second device and the first device may include one or more of the following information: a type of a frame that should be fed back by the second device to the first device, information that should be fed back by the second device by using the frame to the first device, a quantity of antennas, an antenna ID, a sector ID/beam ID, a channel aggregation indication used to indicate whether channel aggregation is used, a bandwidth (BW), a primary channel number, a SISO/MIMO indication used to indicate use of SISO or MIMO, an SU-MIMO/MU-MIMO indication used to indicate use of SU-MIMO or MU-MIMO, a group ID, a transmit power (TX power) of the first device, a target received signal strength indicator (RSSI), a timing advance, a modulation and coding scheme (MCS), channel allocation/resource unit (RU) allocation, and spatial stream allocation (SS allocation)/random access resource unit information (random access RU information).

For a meaning of any one of the foregoing information, refer to a meaning of related information in an existing technology, an existing protocol, or an existing standard. For brevity, details are not repeated. For example, the quantity of antennas may be a quantity of antennas that are used for MIMO communication and that are on the second device, the antenna ID may be an ID of an antenna that is used for MIMO communication and that is on the second device, the sector ID/beam ID may be an ID of a sector or a beam corresponding to an antenna that is used for MIMO communication and that is on the second device, and the channel aggregation indication may be used to indicate whether the second device uses channel aggregation.

S220: The second device in the one or more second devices performs the MIMO communication with the first device based on the configuration information.

Specifically, after receiving the control trailer from the first device, the second device in the one or more second devices obtains the configuration information from the control trailer, and performs the MIMO communication with the first device based on the configuration information.

In an example embodiment, the first device and the second device may perform the MIMO communication in a high frequency band.

For example, the configuration information may be configuration information used for uplink SU-MIMO. In this case, the network device may send the configuration information to only one terminal device, and then the terminal device performs SU-MIMO communication with the network device based on the configuration information.

For example, the configuration information may be configuration information used for uplink MU-MIMO. In this case, the network device may send the configuration information to a plurality of terminal devices, and then the plurality of terminal devices perform MU-MIMO communication with the network device based on the configuration information.

For a specific implementation in which the second device performs the MIMO communication with the first device based on the configuration information, refer to an implementation in which a STA performs MIMO communication with an AP in an existing communications system. For brevity, details are not repeated.

In this embodiment, the first device may include the configuration information used for MIMO in the control trailer, to send the configuration information to the second device by using the control trailer, so that the MIMO communication between the first device and the second device is implemented. In addition, in this embodiment, because the configuration information is carried in the control trailer, a new frame may not needed to carry the configuration information, so that overheads of transmission between the first device and the second device can be reduced, and implementation complexity of communication between the first device and the second device can be reduced.

Figure 3:
FIG. 3 is a schematic structural diagram of information in a communication method according to an embodiment of this application.

In this embodiment, a frame used for transmitting data is referred to as a data frame. Optionally, in this embodiment, the control trailer carrying the configuration information may be after a data frame, and the control trailer and the data frame are sent to the second device together. Herein, that the control trailer is after a data frame may be understood as that the control trailer is after the data frame in a time sequence. FIG. 3 is an example diagram of a combination structure combining the data frame and the control trailer.

Certainly, the control trailer may alternatively be added after another frame, so that the control trailer and the another frame are sent to the second device together. This is not limited in embodiments of this application.

For example, when the first device is an AP, and the second device is a STA, the first device may send a physical layer convergence protocol (PLCP) data unit to the STA, where the physical layer convergence protocol data unit may be referred to as a PPDU for short, and the PPDU includes the data frame and/or the control trailer.

After receiving the data frame from the first device, the second device may determine whether the control trailer is added after the data frame. If the control trailer is added after the data frame, the second device may control the configuration information carried in the control trailer, and may perform the MIMO communication with the first device based on the configuration information.

Optionally, the first device may further send indication information to the second device, to indicate whether the control trailer is added after the data frame. After receiving the indication information, the second device may determine, based on the indication information, whether the control trailer is added after the data frame.

For example, the indication information may be added after the data frame to indicate whether the control trailer is added after the data frame. Certainly, whether the control trailer is added after the data frame may alternatively be indicated in another manner. For example, the indication information may be carried in a scrambling initialization field of a port physical layer (PHY) in a single carrier (SC) or in an orthogonal frequency division multiplexing (OFDM) technology, or the like; or the indication information may be carried in a new header, for example, a future directional multi-gigabit (FDMG) header.

Figure 4:
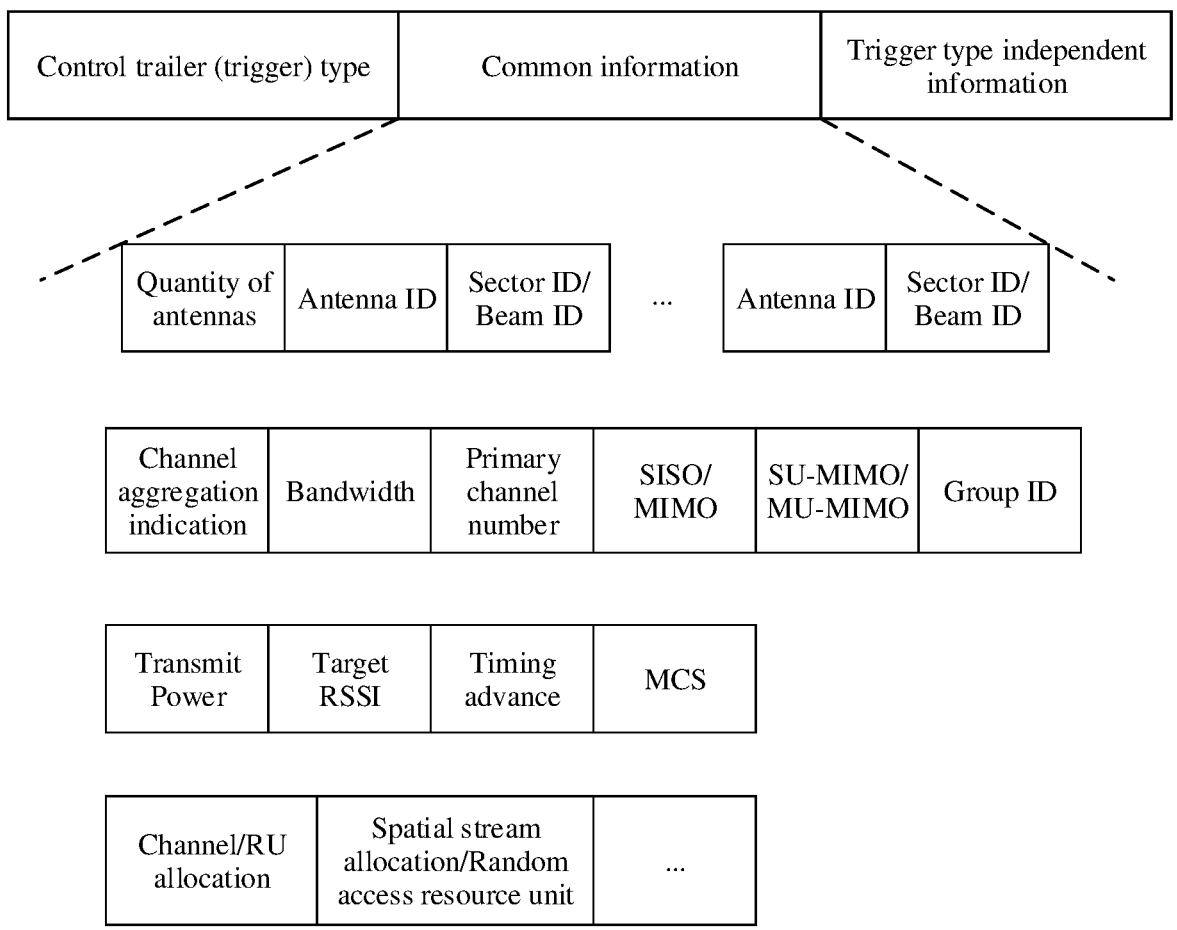
FIG. 4 is a schematic structural diagram of a control trailer according to an embodiment of this application.

FIG. 4 is a schematic structural diagram of the control trailer according to an embodiment of this application. A control trailer type may also be referred to as a control trailer trigger type, and indicates a type of a frame that is indicated by the first device and that should be fed back by the second device to the first device. Common information may include one or more of the foregoing configuration information. Trigger type independent information (trigger type independent info) indicates information that is indicated by the first device and that should be fed back, to the first device, by the second device by using a frame corresponding to a control trailer trigger type.

It should be understood that the control trailer shown in FIG. 4 is merely an example, and shall not constitute a limitation on the control trailer in embodiments of this application.

The control trailer trigger type may indicate any one of the following frame types: a basic trigger frame, a beamforming report poll (BRP) trigger frame, a multi-user block acknowledgment request (MU block acknowledgment request, MU-BAR) trigger frame, a multi-user request to send (MU request to send, MU-RTS) trigger frame, a buffer status report poll (BSRP) trigger frame, a group cast with retries multi-user block acknowledgment request (GCR MU-BAR) trigger frame, a bandwidth query report poll (BQRP) trigger frame, or a null data packet (NDP) feedback report poll trigger frame.

For a meaning of any one of the foregoing frames, refer to a meaning of a related frame in an existing technology, an existing protocol, or an existing standard. For brevity, details are not repeated.

In other words, after receiving the control trailer shown in FIG. 4 from the first device, the second device may feed back a frame corresponding to the "control trailer trigger type" to the network device based on the configuration information in the "common information" in the control trailer, where the frame carries information indicated by the "trigger type independent information".

In this embodiment, optionally, the first device may further add a padding bit after and/or before the control trailer, so that lengths of data packets sent by the first device to a plurality of second devices are the same. Therefore, all second devices may have enough time to process information in the data packets, and the plurality of second devices can complete processing of the data packets at a same time, to implement synchronization between the plurality of second devices. An example of the padding bit is a training (TRN) sequence.

Figure 5:
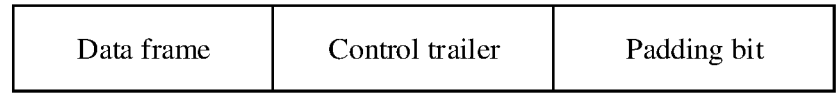
FIG. 5 is a schematic structural diagram of information in a communication method according to another embodiment of this application.

FIG. 5 is an example diagram of a combination structure combining the data frame, the control trailer, and the padding bit.

In certain embodiments of this application, optionally, the configuration information used by the terminal device and the network device to implement MIMO may further be carried in a high throughput (HT) control field.

Alternatively, optionally, a new frame may be designed, where the frame carries the configuration information used by the second device and the first device to implement MIMO. For example, a trigger frame similar to that in an existing technology, an existing protocol, or an existing standard may be designed, where the trigger frame carries the configuration information. The first device sends such a frame to the second device, to send the configuration information to the second device, and then the second device performs the MIMO communication with the first device based on the configuration information.

Figure 6:
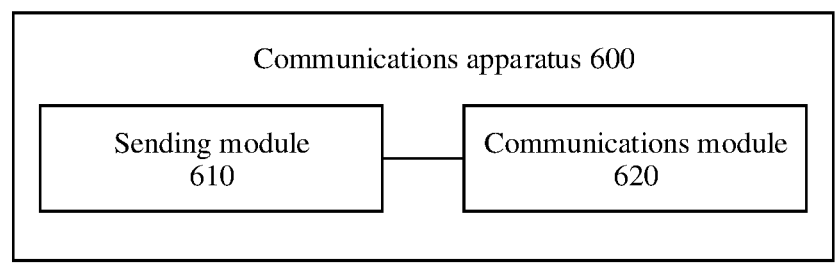
FIG. 6 is a schematic block diagram of a communications apparatus according to an embodiment of this application.

FIG. 6 is a schematic block diagram of a communications apparatus according to an embodiment of this application. As shown in FIG. 6, the communications apparatus 600 may include a sending module 610 and a communications module 620. The modules included in the communications apparatus 600 may be implemented by software and/or hardware.

The communications apparatus 600 may be configured to perform steps performed by the network device in the communication method described in FIG. 2.

For example, the sending module 610 is configured to send, to one or more second devices, configuration information used for multiple-input multiple-output (MIMO) communication between the second device and the communications apparatus 600, where the configuration information is carried in a control trailer.

The communications module is configured to perform the MIMO communication with the one or more second devices based on the configuration information.

Optionally, the control trailer is after a data frame.

Optionally, there is a padding bit after the control trailer.

Optionally, the padding bit is a training sequence.

Optionally, the configuration information includes at least one of the following information: a type of a frame that should be fed back by the second device to the communications apparatus, information that should be fed back by the second device by using the frame to the communications apparatus, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the communications apparatus, a target receive signal strength indicator, a timing advance, a modulation and coding scheme, channel allocation information/resource unit allocation information, or spatial stream allocation information/random access resource unit information.

Optionally, the communications apparatus may be a network device, for example, an AP. Alternatively, the communications apparatus may be a terminal device, for example, a STA. Alternatively, the communications apparatus may be a chip that can be integrated into a network device, for example, may be a chip that can be integrated into an AP. Alternatively, the communications apparatus may be a chip that can be integrated into a terminal device, for example, may be a chip that can be integrated into a STA.

Figure 7:
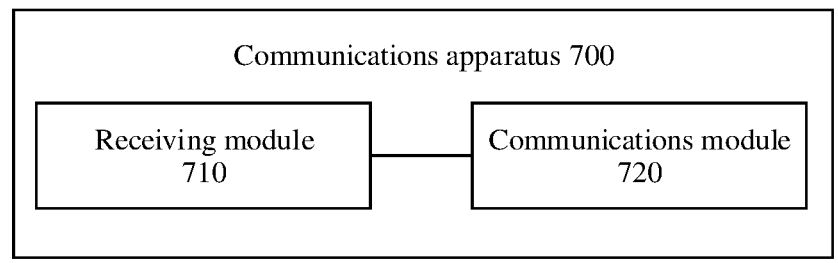
FIG. 7 is a schematic block diagram of a communications apparatus according to another embodiment of this application.

FIG. 7 is a schematic structural diagram of a communications apparatus according to an embodiment of this application. It should be understood that the communications apparatus 700 shown in FIG. 7 is merely an example. The communications apparatus in this embodiment of this application may further include other modules or units, or include modules having functions similar to those of modules in FIG. 7, or does not necessarily need to include all the modules in FIG. 7.

The communications apparatus 700 shown in FIG. 7 may include a receiving module 710 and a communications module 720. The modules included in the communications apparatus 700 may be implemented by software and/or hardware.

The communications apparatus 700 may be configured to perform steps performed by the terminal device in the communication method described in FIG. 2.

For example, the receiving module 710 is configured to receive, from a first device, configuration information used for MIMO communication between the communications apparatus and the first device, where the configuration information is carried in a control trailer.

The communications module 720 is configured to perform the MIMO communication with the first device based on the configuration information.

Optionally, the control trailer is after a data frame.

Optionally, there is a padding bit after the control trailer.

Optionally, the padding bit is a training sequence.

Optionally, the configuration information includes at least one of the following information: a type of a frame that should be fed back by the communications apparatus to the first device, information that should be fed back by the communications apparatus by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

Optionally, the communications apparatus may be a network device, for example, an AP. Alternatively, the communications apparatus may be a terminal device, for example, a STA. Alternatively, the communications apparatus may be a chip that can be integrated into a network device, for example, may be a chip that can be integrated into an AP. Alternatively, the communications apparatus may be a chip that can be integrated into a terminal device, for example, may be a chip that can be integrated into a STA.

Figure 8:
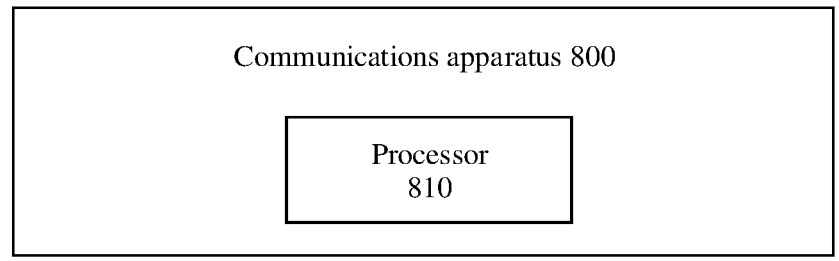
FIG. 8 is a schematic structural diagram of a communications apparatus according to another embodiment of this application.

FIG. 8 is a schematic structural diagram of a communications apparatus according to an embodiment of this application. It should be understood that the communications apparatus 800 shown in FIG. 8 is merely an example. The communications apparatus in this embodiment of this application may further include other modules or units, or include modules having functions similar to those of modules in FIG. 8, or does not necessarily need to include all the modules in FIG. 8.

The communications apparatus 800 includes a processor 810, and the processor is configured to execute one or more program instructions. Optionally, the communications apparatus 800 may further include a memory, configured to store the one or more program instructions executed by the processor.

In an example embodiment, the processor 810 executes the one or more program instructions, to implement one or more operations implemented by the network device in the communication method in FIG. 2.

For example, when executing the program instruction, the processor may send, to one or more second devices, configuration information used for multiple-input multiple-output (MIMO) communication between the second device and the communications apparatus, where the configuration information is carried in a control trailer; and perform the MIMO communication with the one or more second devices based on the configuration information.

Optionally, the control trailer is after a data frame.

Optionally, there is a padding bit after the control trailer.

Optionally, the padding bit is a training sequence.

Optionally, the configuration information includes at least one of the following information: a type of a frame that should be fed back by the second device to the communications apparatus, information that should be fed back by the second device by using the frame to the communications apparatus, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the communications apparatus, a target receive signal strength indicator, a timing advance, a modulation and coding scheme, channel allocation information/resource unit allocation information, or spatial stream allocation information/random access resource unit information.

Optionally, the communications apparatus 800 may be a network device, for example, may be an AP. In this case, the communications apparatus 800 may further include a receiver and a transmitter. The transmitter may be configured to perform a "sending" step performed by the first device in the communication method in FIG. 2. The receiver and/or the transmitter may be configured to perform a "communicating" step performed by the first device in the communication method in FIG. 2.

Optionally, the communications apparatus 800 may be a chip that can be integrated into a network device (for example, an AP). In this case, the communications apparatus 800 may further include a communications interface. The communications interface is configured to perform the "sending" step and the "communicating" step that are performed by the first device in the communication method in FIG. 2.

Optionally, the communications apparatus 800 may be a terminal device, for example, a STA. In this case, the communications apparatus 800 may further include a receiver and a transmitter. The transmitter may be configured to perform a "sending" step performed by the second device in the communication method in FIG. 2. The receiver and/or the transmitter may be configured to perform a "communicating" step performed by the second device in the communication method in FIG. 2.

Optionally, the communications apparatus 800 may be a chip that can be integrated into a terminal device (for example, a STA). In this case, the communications apparatus 800 may further include a communications interface. The communications interface is configured to perform the "sending" step and the "communicating" step that are performed by the second device in the communication method in FIG. 2.

In another example embodiment, the processor 810 is configured to execute one or more program instructions, to implement one or more operations implemented by the terminal device in the communication method in FIG. 2.

For example, when executing the one or more program instructions, the processor may receive, from a first device, configuration information used for MIMO communication between the communications apparatus and the first device, where the configuration information is carried in a control trailer; and perform the MIMO communication with the first device based on the configuration information.

Optionally, the control trailer is after a data frame.

Optionally, there is a padding bit after the control trailer.

Optionally, the padding bit is a training sequence.

Optionally, the configuration information includes at least one of the following information: a type of a frame that should be fed back by the communications apparatus to the first device, information that should be fed back by the communications apparatus by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

Optionally, the communications apparatus 800 may be a terminal device, for example, a STA. In this case, the communications apparatus 800 may further include a receiver and a transmitter. The receiver may be configured to perform a "receiving" step performed by the second device in the communication method in FIG. 2. The transmitter and/or the receiver may be configured to perform a "communicating" step performed by the second device in the communication method in FIG. 2.

Optionally, the communications apparatus 800 may be a chip that can be integrated into a terminal device (for example, a STA). In this case, the communications apparatus 800 may further include a communications interface. The communications interface is configured to perform the "receiving" step and the "communicating" step that are performed by the second device in the communication method in FIG. 2.

Optionally, the communications apparatus 800 may be a network device, for example, may be an AP. In this case, the communications apparatus 800 may further include a receiver and a transmitter. The transmitter may be configured to perform a "sending" step performed by the first device in the communication method in FIG. 2. The receiver and/or the transmitter may be configured to perform a "communicating" step performed by the first device in the communication method in FIG. 2.

Optionally, the communications apparatus 800 may be a chip that can be integrated into a network device (for example, an AP). In this case, the communications apparatus 800 may further include a communications interface. The communications interface is configured to perform the "sending" step and the "communicating" step that are performed by the first device in the communication method in FIG. 2.

A person of ordinary skill in the art may understand that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that such an implementation goes beyond the scope of this application.

A person of ordinary skill in the art may understand that, for the purpose of convenient and brief description, for detailed working processes of the foregoing system, apparatus, and units, refer to corresponding processes in the foregoing method embodiments. Details are not repeated.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit.

It should be understood that in the embodiments of this application, the processor may be a central processing unit (CPU), or the processor may be a general-purpose processor, a digital signal processor (DSP), an application-specific integrated circuit (ASIC), a field programmable gate array (FPGA) or other programmable logic device, a discrete gate or transistor logic device, a discrete hardware component, or the like. The general-purpose processor may be a microprocessor, or the processor may be any conventional processor or the like.

When the functions are implemented in a form of a software functional unit and sold or used as an independent product, the functions may be stored in a computer-readable storage medium. Based on such an understanding, the technical solutions of this application essentially, or the part contributing to an existing technology, or some of the technical solutions may be implemented in a form of a software product. The software product is stored in a storage medium, and includes several instructions for a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

It should be understood that "/" in this application represents "or". The term "and/or" may include three parallel solutions. For example, "A and/or B" may include: A alone; B alone; or A and B in combination.

The foregoing describes merely non-limiting examples of specific implementations and is not intended to limit the protection scope, which is intended to cover any variation or replacement readily determined by a person of ordinary skill in the art. Therefore, the claims shall define the protection scope.

What is claimed is:

1. A communication method, comprising:
   sending, by a first device to one or more second devices, configuration information used for multiple-input multiple-output (MIMO) communication between the one or more second devices and the first device, wherein the configuration information is carried in a control trailer;
   sending, by the first device to the one or more second devices, indication information indicating whether the control trailer is added after a data frame; and
   performing, by the first device, the MIMO communication with the one or more second devices based on the configuration information.

2. The communication method according to claim 1, wherein a padding bit is after the control trailer.

3. The communication method according to claim 2, wherein the padding bit is a training sequence.

4. The communication method according claim 1, wherein the configuration information comprises at least one of the following information: a type of a frame that is to be fed back by the one or more second devices to the first device, information that is to be fed back by the one or more second devices by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

5. The communication method according to claim 1, wherein the indication information is carried in a scrambling initialization field of a port physical layer (PHY) in a single carrier (SC) or in an orthogonal frequency division multiplexing (OFDM) technology.

6. The communication method according to claim 1, wherein the indication information is carried in a future directional multi-gigabit (FDMG) header.

7. A communication method, comprising:
   receiving, by a second device from a first device, configuration information used for MIMO communication between the second device and the first device, wherein the configuration information is carried in a control trailer;
   receiving, by the second device from the first device, indication information indicating whether the control trailer is added after a data frame;
   determining, by the second device, whether the control trailer is added after the data frame based on the indication information; and
   upon determining that the control trailer is added after the data frame based on the indication information, performing, by the second device, the MIMO communication with the first device based on the configuration information.

8. The communication method according to claim 7, wherein a padding bit is after the control trailer.

9. The communication method according to claim 8, wherein the padding bit is a training sequence.

10. The communication method according to claim 7, wherein the configuration information comprises at least one of the following information: a type of a frame that is to be fed back by the second device to the first device, information that is to be fed back by the second device by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

11. A first device, comprising:
- a transceiver, configured to send configuration information used for multiple-input multiple-output (MIMO) communication between one or more second devices and the first device, wherein the configuration information is carried in a control trailer, and send indication information indicating whether the control trailer is added after a data frame to the one or more second devices; and
- a processor, configured to perform the MIMO communication with the one or more second devices based on the configuration information.

12. The first device according to claim 11, wherein a padding bit is after the control trailer.

13. The first device according to claim 12, wherein the padding bit is a training sequence.

14. The first device according claim 11, wherein the configuration information comprises at least one of the following information: a type of a frame that is to be fed back by the one or more second devices to the first device, information that is to be fed back by the one or more second devices by using the frame to the first device, a quantity of antennas, an antenna ID, a sector ID/beam ID, a channel aggregation indication, a bandwidth, a primary channel number, a single-input single-output (SISO)/MIMO indication, a single-user (SU)-MIMO/multi-user (MU)-MIMO indication, a group ID, a transmit power of the first device, a target receive signal strength indicator, a timing advance, a modulation and coding scheme, channel allocation information/resource unit allocation information, or spatial stream allocation information/random access resource unit information.

* * * * *